United States Patent [19]

Downing et al.

[11] 4,398,860
[45] Aug. 16, 1983

[54] FORK LIFT TRUCK HAVING MEANS TO TEST OVERLOAD PROTECTIVE SYSTEM

[75] Inventors: Terry R. Downing, Hazel Crest, Ill.; Allois F. Geiersbach, Milwaukee, Wis.

[73] Assignee: Allis-Chalmers Corporation, Milwaukee, Wis.

[21] Appl. No.: 868,345

[22] Filed: Jan. 10, 1978

Related U.S. Application Data

[63] Continuation of Ser. No. 666,044, Mar. 11, 1976, abandoned.

[51] Int. Cl.³ .............................................. B65G 19/00
[52] U.S. Cl. .................................................... 414/634
[58] Field of Search .................. 214/660, 670–674; 212/39 R, 39 A, 39 B, 39 DB, 39 MS, 39 P; 340/267 C

[56] References Cited

U.S. PATENT DOCUMENTS 3,866,200  2/1975  Paredes ........................... 340/267 C
4,003,487  1/1977  Downing ............................ 214/673

Primary Examiner—Trygve M. Blix
Assistant Examiner—R. Johnson
Attorney, Agent, or Firm—Lee H. Kaiser

[57] ABSTRACT

A fork lift truck has a safety system for inhibiting further raising of the carriage or further forward tilting of the mast when an excessive tilting moment is acting on the truck and permits the truck operator to selectively simulate an overload on the truck and provides a visual indication that the safety system has responded properly to such simulated overload, thereby permitting the truck operator to test whether or not the truck is protected from picking up an overload.

14 Claims, 1 Drawing Figure

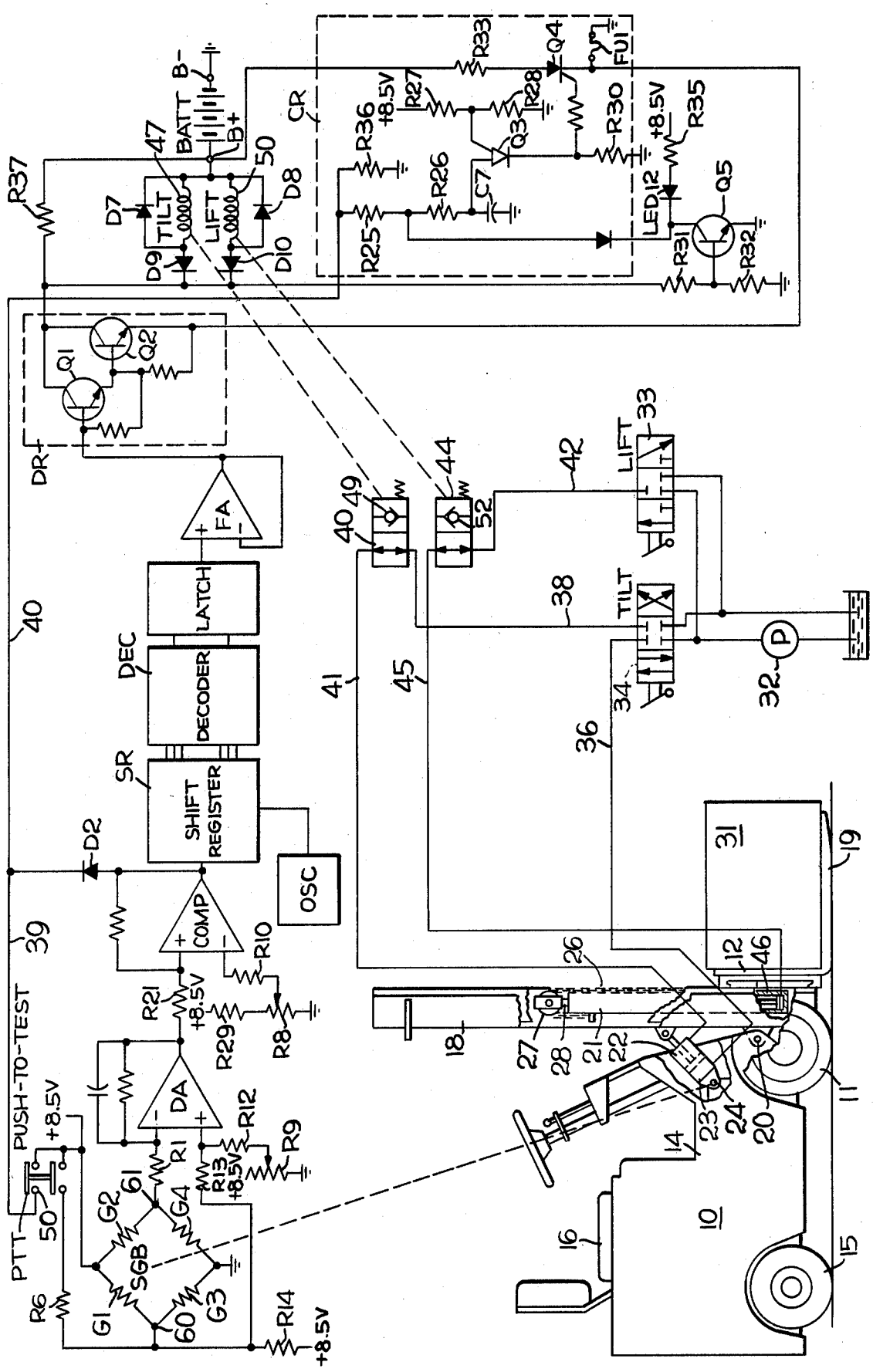

FORK LIFT TRUCK HAVING MEANS TO TEST OVERLOAD PROTECTIVE SYSTEM

This is a continuation, of application Ser. No. 666,044, filed Mar. 11, 1976 now abandoned.

This invention relates to an overload protective system for a fork lift truck which is reponsive to excessive tilting moment acting on the truck, as a result of a load on the carriage raised on the tilted mast, to disable the carriage elevating motor and the mast tilting motor and thus prevent the truck operator from increasing the danger of overturning the truck during material handling operations.

BACKGROUND OF THE INVENTION

A safety system for a fork lift truck is disclosed in copending application 546,720 in the name of Terry R. Downing filed Apr. 3, 1975, now U.S. Pat. No. 4,003,487 and having the same assignee as this invention which responds to excessive forward overturning moment acting on the truck by disabling the carriage elevating motor so the carriage cannot be raised further and also disabling the mast tilting motor to prevent further forward tilting of the mast, thereby preventing shifting of the carriage in a direction which would increase the danger of overturning the truck. However, such safety system involves a complex electronic circuit including many electronic components which can fail and thus prevent the safety system from operating properly, but the truck is capable of material handling operations even though a component of the safety system has failed. Thus the lift truck operator cannot ascertain whether the safety system disclosed in application Ser. No. 564,720 is functioning satisfactorily and does not know at all times whether the lift truck is protected from picking up an overload.

OBJECTS OF THE INVENTION

It is an object of the invention to provide an improved overload safety system for a fork lift truck which permits the operator to selectively simulate an overload on the truck and provides an indication that the safety system responds properly to such simulated overload, thereby informing the operator whether or not his truck is protected from picking up an excessive load.

SUMMARY OF THE INVENTION

A fork lift truck has a tilting mast; a load supporting carriage; a mast tilting motor; a carriage elevating motor; an overload protective system including a sensor for deriving an electrical tilting-moment signal proportional to the forward tilting moment acting on the truck tending to overturn it as a result of a load on the raised carriage; a comparator responsive to a predetermined magnitude of the tilting-moment signal indicative of an excessive tilting moment acting on said truck for generating an overload signal; means coupled to the comparator for disabling the carriage elevating motor and the mast tilting motor in response to the overload signal; overload simulating means for selectively applying an electrical input signal to the motor disabling means having a magnitude at least equal to said predetermined magnitude, thereby permitting the operator to simulate an overload on the truck; and means for providing a visual indication that the motor disabling means has operated to disable the mast tilting and carriage elevating motors in response to the simulated overload.

In a preferred embodiment the sensor includes a load supporting member subjected to the tilting moment, a plurality of strain gages mounted on the load carrying member and arranged in an electrical bridge, and a differential amplifier having its inputs coupled across a diagonal of the bridge and having its output coupled to the comparator, and the overload simulating means includes means for unbalancing the the bridge sufficiently to cause the comparator to generate the overload signal. The motor disabling means preferably includes a normally conductive semiconductor switch and hydraulic blocking valves having operating coils in series with the semiconductor switch and normally holding the valves in open position to thereby enable the mast tilting and carriage elevating motors, and wherein the semiconductor switch is turned off in response to the overload signal to thereby close the hydraulic valves and block flow of fluid to the mast tilting motor in a direction which sould increase the mast forward tilt and also to the carriage elevating motor in a direction which would further raise the carriage. The means to provide a visual indication preferably includes a light emitting diode and means controlled by the voltage across the semiconductor switch for lighting the diode.

DESCRIPTION OF THE DRAWING

These and other objects and advantages of the invention will be more readily apparent from the following detailed description when considered in conjunction with the single FIGURE of the accompanying drawing which is a schematic diagram of an overload protective system for a lift truck embodying the invention with portions of the known system shown in block form.

DETAILED DESCRIPTION

The invention is illustrated in the single FIGURE of the drawing as being incorporated in the overload protective system for a fork lift truck disclosed in the copending application of Terry R. Downing Ser. No. 564,720 filed Apr. 3, 1975, and having the same assignee as this invention and which continuously monitors the overturning, or tilting moment acting on a counterbalanced lift truck 10 tending to tilt the truck about its front wheels 11 and which operates in response to a predetermined excessive tilting moment to prevent shifting of a load support carriage 12 in either a horizontal direction or in a vertical direction which would increase the forward tilting moment. The lift truck 10 may have a main frame 14, a pair of steerable rear wheels 15, an operator's seat 16, a vertical mast 18 pivotally connected to frame 14 on a transverse axis by pins 20, a carriage elevating motor which preferably comprises a single lift jack 21 for elevating and lowering carriage 12 with forks 19 on mast 18, and a mast tilting motor which preferably comprises double acting hydraulic tilt jack 22 for tilting mast 18. Tilt jack 22 has a tilt cylinder 23 pivotally connected on a transverse axis to the frame 14 about a load carrying tilt jack anchor pin 24 and a piston rod pivotally connected on a transverse axis to mast 18. Lift jack 21 includes a hydraulic lift cylinder 46 which supports the carriage 12 through a chain 26 trained over a pulley 27 mounted on the top of lift jack piston 28. When a load 31 is supported on forks 19 and mast 18 is tilted, an overturning moment acts on truck 10 tending to tilt it about front wheels 11 as a fulcrum, and such overturning moment is resisted by tilt jack 22 and tilt jack anchor pin 24, whereby pin 24 is subjected to mechanical stress which is proportional to the tilting moment acting on the truck 10.

The hydraulic control system for carriage elevating motor 21 and mast tilting motor 22 may include a pump 32; manually operable lift and tilt control valves 33 and 34; a tilt cylinder support conduit 36 connecting the manual tilt control valve 34 with the closed end of the tilt cylinder 23; a tilting supply conduit 38 connecting tilt valve 34 to a tilt blocking valve 40 which is connected through a conduit 41 to the rod end of tilt cylinder 23; a lift supply conduit 42 connecting the manual lift valve 33 to a lift blocking valve 44 which is connected through a conduit 45 to the bottom end of lift cylinder 46.

Tilt blocking valve 40 is normally held open by its operating coil 47 which is energized during normal material handling operations, thereby permitting the truck operator to tilt mast 18 forward by operating tilt valve 34 to supply pressurized fluid from pump 32 to the closed end of tilt cylinder 23 through conduit 36 and force fluid out of the rod end of tilt cylinder 23 through conduit 41. When operating coil 47 of tilt blocking valve 40 is deenergized, valve 40 closes so that check valve 49 prevents discharge of fluid from the rod end of tilt cylinder 23 through conduit 41, thereby disabling the mast tilting motor and inhibiting it from further forward tilting of mast 18, but check valve 49 permits the operator to supply pressurized fluid from pump 32 to the rod end of the tilt cylinder 23 through conduit 41 and thereby actuate the mast tilting motor to decrease the forward tilt of mast 18.

Lift blocking valve 44 is normally held open by its operating coil 50 which is energized during material handling operations, thereby permitting the operator to raise carriage 12 by supplying pressurized fluid through valves 33 and 44 in series and conduit 45 to the bottom end of lift cylinder 46, or to lower carriage 12 by exhausting fluid from cylinder 46. When operating coil 50 is deenergized, lift blocking valve 44 closes so that check valve 52 blocks supply of pressurized fluid to the bottom end of lift cylinder 46, thus disabling the carriage elevating motor from raising carriage 12 but permitting the truck operator to lower the load 31 under control of manual valve 33.

The safety system for preventing excessive tilting moment on the truck may include four resistance strain gages G1, G2, G3, G4 mounted externally on tilt anchor pin 24 and arranged in a full bridge electrical circuit SGB. Strain gage bridge SGB derives an electrical "tilting-moment" or "strain" signal proportional to the mechanical strain in pin 24 and thus of the tilting moment acting on truck 10, and a differential operational amplifier DA raises the level of the output signal from bridge SGB. A comparator operational amplifier COMP receives the output of differential amplifier DA and derives a trip or overload signal when the tilting-moment signal reaches a predetermined magnitude indicating that excessive overturning moment is acting on the truck.

The junction of strain gages G3 and G4 may be grounded and a regulated unidirectional power supply shown as +8.5 volts may be applied across a diagonal of the bridge between the junction of strain gages G1 and G2 and ground. When no load is supported on carriage 12, the strain gage sensor bridge SGB will be unbalanced due to the weight of carriage 12 and mast 18 and also due to differences in the resistances of the strain gages resulting from manufacturing tolerances, and an unbalance voltage may exist across bridge output terminals 60 and 61 which must be compensated for since the output of high gain differential amplifier DA would swing over a wide voltage range as a result of relatively small differential voltage applied across its inputs. Isolating resistances R1 and R13 respectively connect bridge output terminals 61 and 60 to the inverting and noninverting inputs of the high gain differential amplifier DA of the protective system. Bridge SGB becomes further unbalanced when a force due to load 31 is applied to tilt anchor pin 24, and bridge SGB generates a tilting-moment, or strain signal, in proportion to mechanical strain in anchor pin 24, and thus to the overturning moment acting on the truck 10. Bridge output terminal 60 is connected through a resistance R14 to the +8.5 volt supply to form a voltage divider of four series resistances R14, R13, R12 and R9 to ground. The noninverting input of differential amplifier DA is coupled through resistance R12 to the wiper of a bridge unbalance compensation potentiometer R9 whose winding is connected between the +8.5 volt supply and ground and which permits compensation for minor unbalance in bridge SGB so that, after adjustment by R9 to set the output of amplifier DA to approximately zero volts, the inputs of DA effectively see zero voltage across the bridge output terminals 60 and 61 when carriage 12 is unloaded. The currents resulting from bridge unbalance and from voltage divider R14, R13, R12, R9 are summed at the noninverting input of DA and the sum can be set to zero by adjusting compensation potentiometer R9 so that bridge SGB is, in effect, balanced. A visual indiator (not shown) may be provided, as disclosed in aforementioned application Ser. No. 564,720, to give a visual signal when the output of differential amplifier DA is approximately zero volts, thereby indicating that zero potential difference exists between the inverting and noninverting inputs to amplifier DA and that bridge SGB is balanced.

The output of differential amplifier DA is coupled through a resistance R21 to the noninverting input of comparator operational amplifier COMP which generates a trip or overload signal when the forward tilting moment acting on the truck 10, and thus the strain signal from bridge SGB, exceeds a predetermined magnitude. The inverting input of COMP is coupled through a resistance R10 to the wiper of a trip point adjustment potentiometer R8 whose winding is connected in series with a resistance R29 between the +8.5 volt supply and ground so the output of COMP is normally logic zero. Trip point adjusting potentiometer R8 applies a predetermined positive voltage to the inverting input to COMP and thus permits setting of the predetermined forward tilting moment beyond which carriage 12 should not be raised or mast 18 tilted further forward.

The output from comparator COMP is applied to the data input of a shift register SR shown in block form which also receives a train of clock pulses from an oscillator OSC as a time reference and records the history of the output of comparator COMP over a period of time, i.e., whether the trip signal caused by excessive tilting moment has existed for a period of time. The data accumulated in shift register SR is analyzed in a decoder DEC that sets a latch LATCH shown in block form which, in response thereto, generates a disable logic 0 signal. The disable signal from the LATCH is coupled through a voltage follower amplifier FA to the base of an NPN base drive transistor Q1 of an operating coil drive amplifier DR to thereby turn Q1 off. This turns off NPN power transistor Q2 which is connected in series with the paralleled operating coils 47 and 50 between the positive terminal B+ and the grounded negative terminal B− of a battery BATT carried by the truck, thereby deenergizing operating coils 47 and 50 of blocking valves 40 and 44 respectively to prevent further raising of load support carriage 12 and also preventing further tilting of mast 18 in the forward direction.

Transistors Q1 and Q2 are connected in Darlington arrangement with the emitter-collector circuit of Q2 comprising a semiconductor switch in series with a fuse FU1 of the "crowbar" circuit CR (shown within a dashed line rectangle) and with the paralleled operating coils 47 and 50 and the battery BATT. Under normal material handling conditions, the output of the LATCH is logical one voltage which maintains semiconductor switch Q2 in conduction so that coils 47 and 50 are continuously energized to hold blocking valves 40 and 44 open and thus permit pressurized fluid from pump 32 to be supplied respectively to the rod end of tilt cylinder 23 and to the bottom end of lift cylinder 46. Diodes D10 and D9 connected respectively between the coils 50 and 47 and the collector of Q2 isolate the blocking valve operating coils. Diodes D8 and D7 connected in shunt respectively to operating coils 50 and 47 provide paths for free-wheeling of solenoid currents when the overload protective means is operated to turn off Darlington driver transistor Q1. The LATCH and the operating coil drive amplifier DR may be considered disabling means which close blocking valves 40 and 44 and thus inhibit the lift jack 21 and tilt jack 22 from operation in a direction which would increase the forward tilting moment on truck 10 but permit the operator to lower carriage 12 and tilt mast 18 backward.

The lift truck operator cannot tell whether the protective system described hereinbefore and in application Ser. No. 564,720 is functioning correctly and thus the truck operator does not know whether his lift truck is protected from picking up an overload. A push-to-test pushbutton PTT may be provided on truck 10 to permit the operator to simulate an overload on the truck. Operation of pushbutton PTT connects the power supply +8.5 volts through a resistance R6 to bridge output terminal 60, thereby unbalancing bridge SGB and applying a positive voltage to the noninverting input of differential amplifier DA having a magnitude greater than the predetermined tilting-moment signal output of bridge SGB which results in derivation of the trip signal by COMP. DA amplifies such unbalance signal and provides an output which is detected by comparator COMP and generates a trip or overload signal in response thereto. The trip signal output from comparator COMP is transmitted through shift register SR, decoder DEC, and the LATCH to turn off Darlington transistor Q2. The collector of Q2 is coupled through two series resistances R31 and R32 to ground, and the junction between R31 and R32 is coupled to the base of a transistor Q5 whose collector is connected through a light emitting diode LED 12 in series with a resistance R35 to the power supply +8.5 volts. During normal material handling operations semiconductor switch Q2 is turned on so that its collector voltage is low, with the result that the base of NPN transistor Q5 is biased at a low enough voltage so that Q5 is turned off and LED 12 is not lighted. When the operator pushes button PTT, semiconductor switch transistor Q2 is turned off if the components of the protective system are functioning properly, and the resulting increase in voltage at the collector of Q2, when it is turned off, causes increased current flow through R32 and develops a voltage thereacross which increases the bias on the base of NPN transistor Q5 and turns it on. The resulting flow of collector current in Q5 also passes through light emitting diode LED 12 and illuminates it to provide a visual indication to the truck operator that the protective system is operating properly and that the truck is protected from picking up an overload. The voltage divider R31, R32 prevents Q5 from being turned on by the slight positive voltage at the collector of Q2 when Q2 is normally conducting during material handling operations. Light emitting diode LED 12 also turns on when an overload occurs during material handling operations of truck 10. However, if Darlington transistor Q2 has failed in shorted condition, or if a component failure prevents Q2 from turning off, diode LED 12 will not light when the operator depresses pushbutton PTT, thereby indicating to the operator that a fault exists in the protective system and that the truck is not protected against picking up an overload.

Crowbar circuit CR guards against failure of components in the electrical circuit between comparator COMP and the operating coils 47 and 50 by disabling the carriage elevating and mast tilting motors in the event that the protective system fails to respond properly to the trip signal. The crowbar circuit preferably parallels the protective system circuit and continuously monitors the trip signal (which is indicative that a truck overload exists) and accomplishes crowbar action by rupturing fuse FU1 to disable the mast tilting and carriage elevating motors if Darlington transistor Q2 is not turned off in response to generation of the trip signal. The trip signal is indicative that an overload exists, and failure of Q2 to turn off in response to such trip signal is indicative of component failure. Rupturing of fuse FU1 to assure that the overturning moment acting on the truck cannot be increased under such simultaneous overload and component-failure conditions makes the truck overload protective system as fail-safe as practical.

If an overload occurs on truck 10, a logical one voltage trip signal will be generated by comparator COMP which will cause the LATCH to derive a logical zero disable signal that should turn off Q2 to deenergize tilt solenoid 47 and lift solenoid 50. However, a component failure may prevent transmittal of the trip signal to the driver amplifier DR and, further, transistor Q2 may fail in a shorted mode. Under either such component failure condition, the tilt and lift solenoid would not be deenergized when overload occurs, and consequently the truck would not be protected against picking up an overload. In order to guard against such component failure, the logical one trip signal derived by comparator COMP may be coupled through a diode D2 and over a lead 40 and through two series resistances R25 and R26 to initiate charging of a capacitor C7 of the crowbar circuit. Under normal material handling conditions, Q2 will be turned off as a result of the trip signal, thereby increasing its collector voltage and developing a voltage across R32 which increases bias on Q5 and turns it on. The emitter-collector path of Q5 is connected in series with a diode D11 between ground and the junction between resistances R25 and R26, and turning on of Q5, in effect, shorts C7 to ground (through D11 and Q5) to prevent C7 from accumulating a charge under such nonfault conditions. Resistances R25 and R26 limit charging current to capacitor C7 and provide an RC time delay in charging C7. Transistor Q5 prevents crowbar action by disabling the charging circuit to C7 under normal circuit conditions. R26 also limits collector current of Q5 when C7 discharges through Q5. Resistance R37 provides base bias to Q5 and prevents LED 12 from lighting in the event that both operating coils 47 and 50 are open-circuited or removed.

Crowbar action occurs if a component of the protective circuit fails and prevents Q2 from turning off when the trip signal is generated. Under such simultaneous overload and failed-component conditions, Q2 remains on and Q5 remains off, and the logical one voltage trip signal generated by comparator COMP charges capacitor C7 through R25 and R26 to effect crowbar action. C7 is charged by the trip signal through R25 and R26 in series (since Q5 is not turned on) at a rate dependent upon the RC time constant of C7 times (R25 plus R26). Capacitor C7 is coupled to the anode of a programmable unijunction transistor Q3 whose anode-cathode path is connected in series with a resistance R30 between capacitor C7 and ground. The preselected triggering level at which Q3 becomes conductive is determined by a voltage divider comprising two series resistances R27 and R28 connected between the +8.5 volt supply and ground with the junction between R27 and R28 coupled to the gate of Q3. When the voltage built up across C7 reaches such triggering level, Q3 fires and discharges C7 through its anode-cathode path and resistance R30 to ground. The resulting current flow through R30 develops a voltage which is impressed through a resistance R29 upon the gate of an SCR, or thyristor Q4, and turns it on. The anode-cathode circuit of Q4 is connected in series with a resistance R33 between the positive terminal B+ of the battery BATT and one side of fuse FU1, and conduction by Q4 applies the voltage of battery BATT across fuse FU1 in series with resistance R33 to accomplish crowbar action. Consequently fuse FU1 ruptures, thereby opening the current path to the emitter of Q2 and also to the tilt and lift solenoids 47 and 50, and preventing the mast tilting motor and the carriage raising motor from operating carriage 12 in a direction which would increase the forward tilting moment acting on truck 10. R33 limits the peak current in thyristor Q4.

In the push-to-test mode, the crowbar circuit CR reacts to failure of any component in the protective circuit by rupturing fuse FU1 to thereby disable the carriage raising and mast tilting motors from increasing the tilting moment acting on truck 10. As described hereinbefore, when pushbutton PTT is depressed, bridge SGB is unbalanced and causes comparator COMP to generate the trip signal which results in Q2 turning off and Q5 turning on, under nonfault conditions, to thereby light LED 12 and short C7 to thereby prevent crowbar action. However, if Q2 should fail shorted or if other component failure prevents Q2 from turning off when pushbutton PTT is depressed, the collector voltage of Q2 will remain low and consequently Q5 will not be turned on. The logical one trip signal generated by comparator COMP, as a result of bridge unbalance when PTT is depressed, will be coupled through D2 and over lead 40 of the crowbar circuit to charge capacitor C7.

If a component failure exists in bridge SGB or in amplifier DA or in the comparator COMP which prevents generation of the trip signal by COMP when PTT is depressed, the +8.5 volts supply will be connected through the contacts 50 of PTT and over leads 39 and 40 to apply to the crowbar circuit a signal analogous to the overload signal to thereby charge capacitor C7 and thus effect crowbar action.

While only a single embodiment of our invention has been illustrated and described, many modifications and variations thereof will be readily apparent to those skilled in the art, and consequently it should be understood that we do not intend to be limited to the particular embodiment shown and described.

The embodiments of the invention in which an exclusive property or privilege is claimed are defined as follows:

1. In a fork lift truck having a tilting mast, a load supporting carriage, a mast tilting motor, a carriage elevating motor for raising and lowering said carriage on said mast, overload protective means including sensor means for generating an electrical tilting-moment signal which is a function of the tilting moment acting on said truck and which tilting moment is dependent upon the elevation of said carriage, the weight of the load on the carriage and the angle of inclination of the mast, means receiving said tilting-moment signal as an input for disabling said carriage elevating motor and said mast tilting motor in response to a predetermined value thereof indicative of an overload on said truck, means for providing an indication that said disabling means has operated to disable said carriage elevating and mast tilting motors, and overload simulating means for selectively causing said sensor means to generate a tilting-moment signal having a value equal at least to said predetermined value, thereby permitting the truck operator to simulate an overload on said truck and ascertain from said indication whether or not said truck is protected from picking up on overload.

2. In a fork lift truck in accordance with claim 1 wherein said motor disabling means includes comparator means for generating an overload signal in response to said predetermined value of said tilting-moment signal indicative of an overload on said truck and also includes a normally conductive semiconductor switch which is turned off in response to said overload signal, and wherein said means for providing an indication is controlled by said semiconductor switch.

3. In a fork lift truck in accordance with claim 2 wherein said motor disabling means also includes first and second electrically operated hydraulic valves both of which have operating coils normally energized in series with said semiconductor switch and are operated to closed position when said switch is turned off to respectively block flow of hydraulic fluid to said mast tilting motor in a direction which would increase the mast forward tilt and to block flow of hydraulic fluid to said carriage elevating motor in a direction which would raise said carriages.

4. In a fork lift truck in accordance with claim 3 wherein said semiconductor switch is a transistor and said means for providing an indication is controlled by the collector voltage of said transistor and includes a light emitting diode.

5. In a fork lift truck in accordance with claim 4 wherein said sensor means includes a load carrying member on the truck which resists said tilting moment, a plurality of strain gages mounted on said load carrying member and arranged in an electrical bridge, and a differential amplifier coupled across a diagonal of said bridge, said comparator means being coupled to the output of said differential amplifier.

6. In a fork lift truck in accordance with claim 5 wherein said overload simulating means for selectively causing said sensor means to generate a tilting-moment signal having a value at least equal to said predetermined value includes means for selectively unbalancing said bridge.

7. In a fork lift truck in accordance with claim 1 wherein said sensor means for generating an electrical tilting-moment signal includes an electrical bridge, and said overload simulating means for selectively causing said sensor means to generate a tilting-moment signal having a value at least equal to said predetermined value includes means for selectively unbalancing said bridge.

8. In a fork lift truck in accordance with claim 7 wherein said motor disabling means includes a differential amplifier having its inputs coupled across a diagonal of said bridge and unbalance compensation adjustment means for selectively varying the potential difference between the inputs to said differential amplifier until its output voltage is less than a predetermined value to thereby compensate for unbalance in said electrical bridge when said carriage is unloaded.

9. In a fork lift truck in accordance with claim 8 wherein said sensor means for generating an electrical tilting-moment signal includes a load carrying member on said truck which is subjected to a load proportional to said tilting moment and a plurality of said strain gages mounted on said load carrying member and arranged in said electrical bridge.

10. In combination, a lift truck having a tilting mast, a load supporting carriage, a hydraulic lift jack for raising and lowering said carriage on said mast, a hydraulic tilt jack for tilting said mast, overload protective means including sensor means for deriving an electrical tilting-moment signal whose magnitude is proportional to the tilting moment acting on said truck as a result of a load on said raised carriage, a comparator for deriving an overload signal in response to a predetermined magnitude of said tilting-moment signal indicative of an overload on said truck, means coupled to said comparator for disabling said lift jack and said tilt jack in response to said overload signal, means for providing an indication that said jack-disabling means has operated to disable said lift jack and tilt jack, and overload simulating means for selectively causing said sensor means to derive an electrical tilting moment signal equal at least to said predetermined magnitude, thereby permitting the lift truck operator to test whether or not said lift truck is protected from picking up an overload.

11. In the combination of claim 10 wherein said sensor means includes a load carrying member on said truck which resists said tilting moment and a plurality of strain gages mounted on said load carrying member and arranged in an electrical bridge for detecting the mechanical strain in said load carrying member and for generating said electrical tilting-moment signal whose magnitude varies as a function of said mechanical strain, and wherein said overload simulating means includes means for selectively unbalancing said electrical bridge.

12. In the combination of claim 11 wherein said sensor means also includes a differential amplifier having its inputs coupled across a diagonal of said bridge and unbalance compensation adjustment means for selectively varying the potential difference across the inputs of said differential amplifier until its output voltage is less than a predetermined value to thereby compensate for unbalance in said bridge when said carriage is unloaded.

13. In the combination of claim 12 wherein said means for disabling said lift jack and said tilt jack includes first and second electrically operated hydraulic blocking valves each of which has open and closed positions which respectively allow and block flow of fluid to the corresponding jack and an electrical coil for operating it between said positions and said disabling means also includes a normally conductive semiconductor switch in series with said electrical coils of said lift jack and of said tilt jack and holding them in closed position, said switch being turned off in response to said overload signal, and said means for providing an indication includes visual indicating means controlled by said semiconductor switch.

14. In a fork lift truck having a tilting mast, a load supporting carriage, a mast tilting motor, a carriage elevating motor for raising and lowering said carriage on said mast, a load supporting member which resists the tilting moment acting on said truck as a result of a load on the raised carriage, sensor means including a plurality of strain gages mounted on said load carrying member and arranged in an electrical bridge for generating a tilting-moment electrical signal whose magnitude varies as a function of the mechanical strain in said load carrying member and thus as a function of said tilting moment, a differential amplifier having its inputs coupled across a diagonal of said bridge, comparator means coupled to the output of said differential amplifier for deriving an overload signal when said tilting-moment signal from said bridge exceeds a predetermined magnitude indicative of an overload on said truck, disabling means coupled to the output of said comparator means and being responsive to said overload signal to disable said mast tilting motor and said carriage elevating motor, said disabling means includes a normally conductive transistor switch and electrically operated hydraulic valves having operating coils in series with said transistor switch and which valves respectively control flow of fluid to said mast tilting motor and to said carriage elevating motor, overload simulating means for selectively unbalancing said bridge sufficiently to cause said comparator to generate said overload signal, and indicating means for providing a visual indication when said transistor switch is turned off, thereby permitting the truck operator to selectively test whether or not said lift truck is protected from picking up an overload.

* * * * *